DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 3, 1972

903 O.G. 4

T903,004
FLASH COOLING PROCESS
Robert C. Rose, 13 Ervilla Drive,
Larchmont, N.Y. 10538
Filed May 14, 1971, Ser. No. 143,465
Int. Cl. F25b *19/00*
U.S. Cl. 62—100
1 Sheet Drawing. 9 Pages Specification

FLASH OR VACUUM COOLER

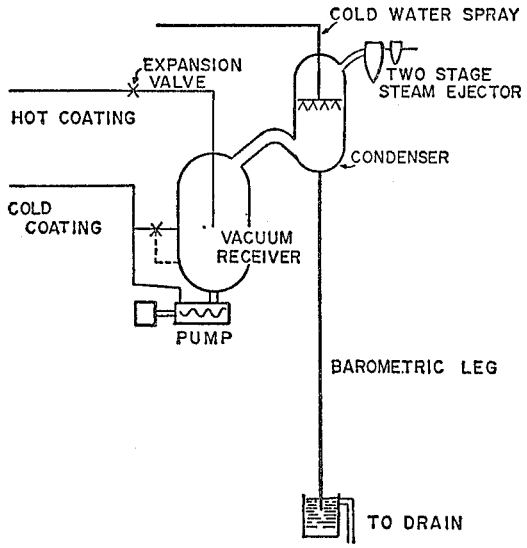

Method and apparatus for cooling coating and coating components by flash evaporation. Cooling coating components results in improved control over coating viscosity, water retention and adhesive retention, factors which effect coating weight and quality.

Oct. 3, 1972 R. C. ROSE T903,004
FLASH COOLING PROCESS
Filed May 14, 1971
FLASH OR VACUUM COOLER
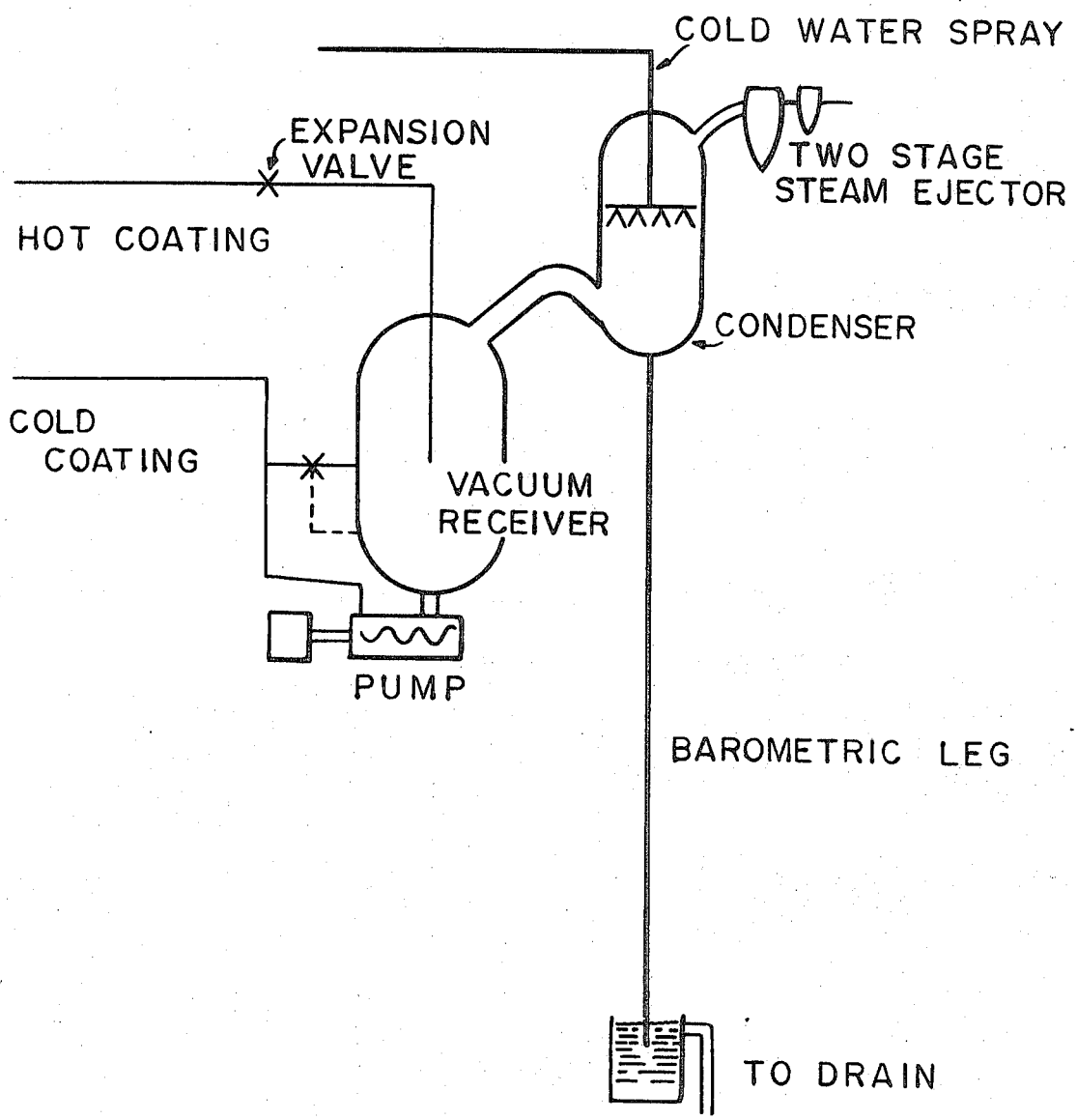
INVENTOR
ROBERT C. ROSE
BY Browne, Beveridge, DeGrandi
ATTORNEYS